United States Patent [19]

Gullberg et al.

[11] Patent Number: 5,532,490

[45] Date of Patent: Jul. 2, 1996

[54] DISPLACED CENTER-OF-ROTATION FAN-BEAM TOMOGRAPHY FOR CARDIAC IMAGING

[75] Inventors: Grant T. Gullberg; Gengsheng L. Zeng, both of Salt Lake City, Utah

[73] Assignee: The University of Utah, Salt Lake City, Utah

[21] Appl. No.: 364,605

[22] Filed: Dec. 27, 1994

[51] Int. Cl.$^6$ ........................ G06F 159/00; G01T 1/166
[52] U.S. Cl. .................. 250/363.04; 364/413.16; 364/413.17; 378/901; 382/131
[58] Field of Search ............... 378/901; 250/363.04; 382/131; 364/413.17, 413.16

[56] References Cited

U.S. PATENT DOCUMENTS

| | | | |
|---|---|---|---|
| 4,812,983 | 3/1989 | Gullberg et al. | 364/413.17 |
| 5,170,439 | 12/1992 | Zeng et al. | 382/131 |
| 5,210,421 | 5/1993 | Gullberg et al. | 250/363.04 |
| 5,338,936 | 8/1994 | Gullberg et al. | 250/363.04 |
| 5,406,479 | 4/1995 | Harman | 364/413.17 |

OTHER PUBLICATIONS

"An Elliptical Orbit Backprojection Filtering Algorithm for SPECT", Gullberg, et al., 1992 IEEE Nuclear Sci. Symposium & Med. Imag. Conference Feb. 1993, pp. 1207–1209.
"An Elliptical Orbit Backprojection Filtering Algorithm for SPECT", Gullberg, et al., IEEE Trans. on Nucl. Science, vol. 40, No. 4, Oct. 1993 pp. 1102–1106.

*Primary Examiner*—Constantine Hannaher
*Attorney, Agent, or Firm*—Fay, Sharpe, Beall, Fagan, Minnich & McKee

[57] ABSTRACT

A SPECT camera system has three detector heads (12a, 12b, 12c). Each of the detectors have a fan-beam collimator (14) disposed toward an examination region (10). The detectors receive radiation travelling along a fan of rays from an apex ($x_f, y_f$) to a planar face of the detectors. The detectors generate electronic data indicative of a location ($x_s, y_s$) on the detector at which a radiation event is received along a ray $q_\beta(s)$. The detectors in a selected orbit $R(\beta)$ around a subject within the examination region (10). A backprojector (56) includes a backprojection trajectory calculating processor (60) that calculates a trajectory through image space, hence through an image memory (58), corresponding to each radiation ray $q_\beta(s)$. The backprojector weights (68) each data value ($x_s, y_s$) with a weighting function, preferably a Jacobian $J(r, \phi, \beta)$, and adds (64) each weighted data value to a corresponding memory cell of the image memory (58). An indexer (62) indexes the memory addresses (66) in the image memory to index the memory cells to which the weighted data value is added and indexes the weighting function (54) such that the weighting function changes along the trajectory. With the preferred $1/r$ weighting function, where r is distance along a radial polar coordinate in image space, the resultant image is blurred. The blurring is removed by deconvolving (70) the blurred image representation in accordance with $1/r$ to generate a corrected image stored in a corrected image memory (80).

16 Claims, 4 Drawing Sheets

DISPLACED CENTER-OF-ROTATION FAN-BEAM TOMOGRAPHY FOR CARDIAC IMAGING

BACKGROUND OF THE INVENTION

The present invention relates to the art of diagnostic imaging. It finds particular application in conjunction with single photon emission computed tomography (SPECT) scanners with fan-beam collimation for medical diagnostic imaging and will be described with particular reference thereto. It is to be appreciated, however, that the invention will have other applications in which fan-beam type data is reconstructed into an image representation for medical, quality assurance, and other examinations.

In single photon emission computed tomography (SPECT), the resolution of the collimated detector deteriorates with increased distance from the face of the collimator. Thus, it is desirable to place the gamma camera as close as possible to the patient to reduce the blurring caused by the distance-dependent system response function and to minimize loss of resolution. To accomplish this, it has been common practice to use non-circular orbits in which the detectors follow the body contour but with the central projection ray of each detector always passing through the center-of-rotation. For parallel collimation, this simplifies the reconstruction algorithm and maintains full body viewing for all projection angles. However, the potential of truncating a selected region of interest increases when imaging with converging collimators.

When imaging off-center organs, such as the heart, particularly with converging collimators with the detector center ray through the center-of-rotation, the off-center organ shifts within the field-of-view and even move partially out of the field-of-view for some projection angles. Parts of the subject which move in and out of the field-of-view resulting in image truncation. Truncation artifacts of the organ of interest are reduced in reconstructed tomograms when a fan-beam detector follows an orbit where the central ray is not constrained to pass through the center-of-rotation.

The challenge in imaging the heart with converging collimators is that the heart is not centrally located in the body and is usually located off the center-of-rotation. It is difficult to position the heart centrally in the field-of-view because the detector is constrained by the outer contour of the body. By restricting the central projection ray to pass through the center-of-rotation, the likelihood of image truncation of the organ of interest greatly increases. The heart can be kept in the field-of-view for each projection angle either by translating or rotating the detector. A second approach may be easier to implement in practice. This is accomplished with fan-beam collimation and rotating the detector gantry in equal angular increments so that the ray from the center-of-rotation to the center of the detector rotates in equal angular increments and at each projection the center of the detector is rotated or translated to place off-center organs in the field-of-view.

A related backprojection algorithm is presented in "An Elliptical Orbit Backprojection Filtering Algorithm For SPECT", G. Gullberg and G. Zeng, 1992 IEEE Nuclear Science Symposium, presented October 1992, printed March 1993, for parallel-beam geometry.

The present invention provides a new and improved reconstruction algorithm for a fan-beam detector, which overcomes the above-referenced truncation problems and others.

SUMMARY OF THE INVENTION

In accordance with the present invention, a new and improved fan-beam reconstruction technique is provided. To collect one set of data, a radiation detector receives radiation travelling along a fan of rays passing through a collimator from an apex to a planar face of the detector. The detector generates views of electrical data indicative of the received radiation. The detector orbits around a center-of-rotation through a subject with the detector face constrained to face perpendicular to a ray passing through a selected point in a region of interest offset from the center-of-rotation as the detector orbits around the center of rotation. At each rotational position around the patient, data is collected which corresponds to coordinates on the planar face of the detectors. For the detector at each coordinate, a corresponding ray is identified, which ray passes through the coordinate and the apex of the fan. A backprojector includes a ray projecting means which identifies a path through an image memory corresponding to the identified ray. The data value is weighted by a weighting function and added to values in the image memory along the identified path. The weighting function changes with distance into the image memory.

In accordance with a more limited aspect of the present invention, the resultant image in the image memory is blurred, generally in accordance with $1/r$, where $r$ is a distance along a radial coordinate in a polar coordinate system of image space. A deconvolver deconvolves the blurred image in accordance with distance along the radial coordinate to remove the blurring. In this manner, a corrected image is generated.

In accordance with a more limited aspect of the present invention, the deconvolver includes a two-dimensional Fourier transform circuit for transforming the backprojected image into Fourier space. A filter multiplies the transformed image by a two-dimensional ramp-filter and the filtered image is transformed out of Fourier space by a two-dimensional inverse Fourier transform.

In accordance with a more limited aspect of the present invention, each backprojected pixel value is weighted by a Jacobian.

One advantage of the present invention is that the resultant images are reconstruction algorithm artifact-free.

Another advantage of the present invention is that image truncation artifacts are reduced.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
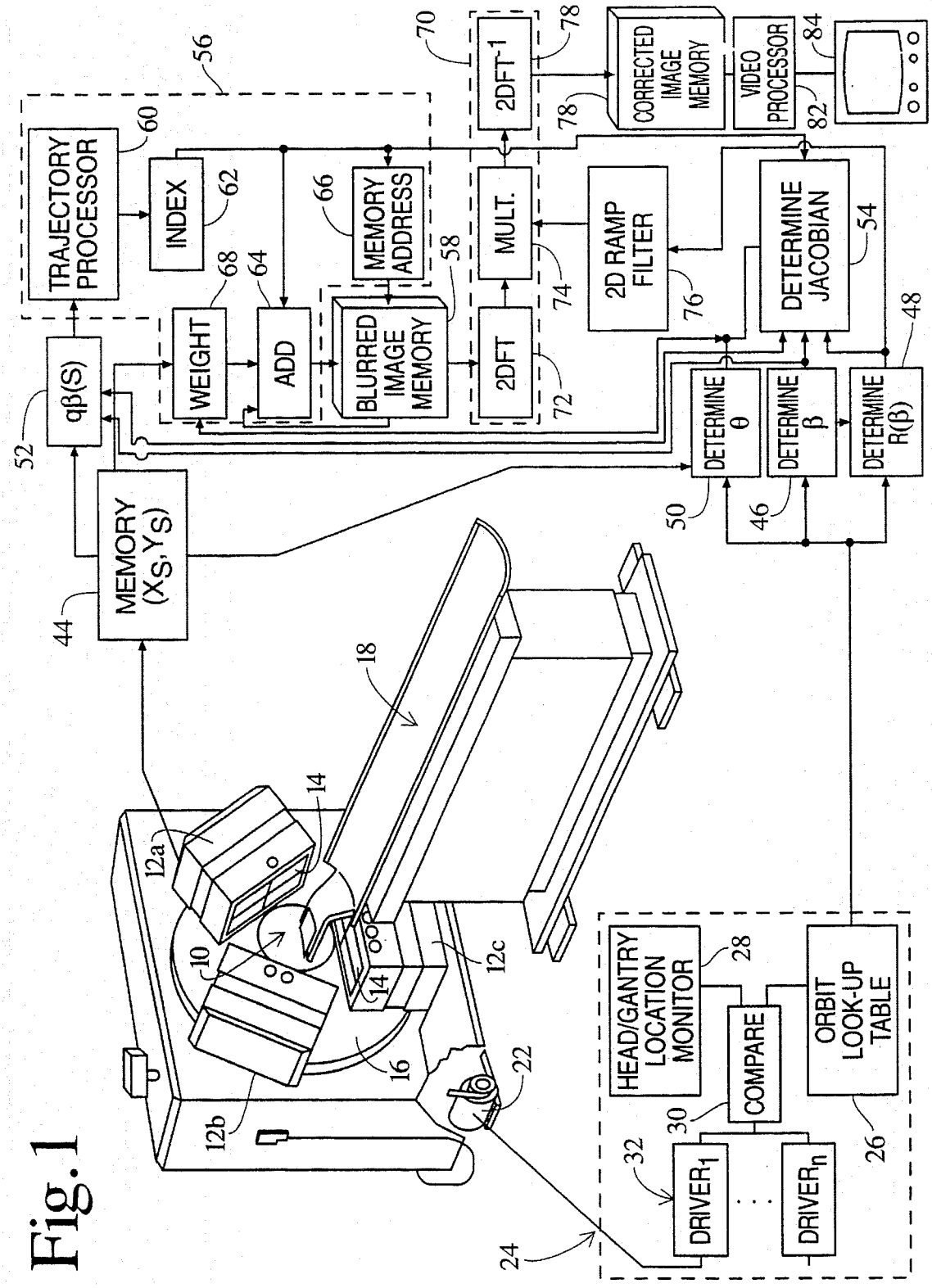
FIG. 1 is a diagrammatic illustration of a SPECT camera in accordance with the present invention.

With reference to FIG. 1, a SPECT camera system has an examination region 10. The examination region is surrounded by three detector heads 12a, 12b, and 12c in the illustrated embodiment. It is to be appreciated that fewer or more detector heads may be used to practice the present invention. As is conventional, each of the detectors have a fan-beam collimator 14 disposed toward the examination region 10 in back of which lies a scintillation crystal and an array of photomultiplier tubes. The fan-beam collimator is oriented such that a focal point $(x_f, y_f)$ of FIG. 4 of its corresponding detector is disposed across the examination region 10 from a subject therein. Radiation emanating from a subject or passing through the subject supported on a patient support 18 follows diverging paths through the collimators 14 to the detector heads 12a, 12b, and 12c. In this manner, a relatively small region of the subject is projected onto a relatively large region of a crystal face of the detector heads, i.e. an effective magnification. The fan-beam collimators can have divergence in one direction to magnify on one dimension or in two directions, i.e., conical, to magnify in two dimensions.

Figure 2:
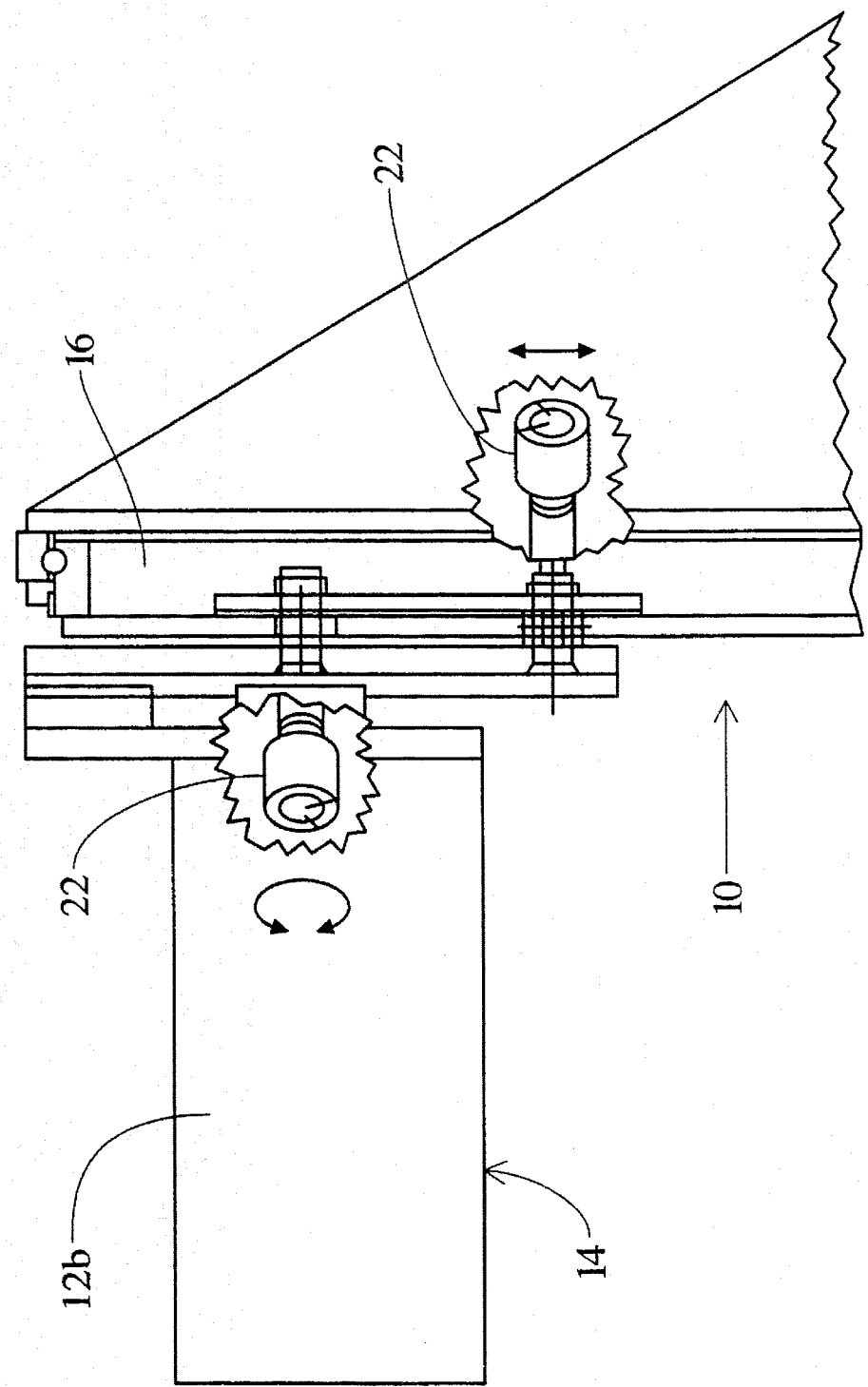
FIG. 2 is a cross-sectional view of the gantry showing the motors for a detector head.

With reference to FIG. 2, the detector heads are mounted on a gantry 16. The gantry includes a plurality of motor drives 22 which are operated individually or in combination in order to move the detector heads radially and circumferentially and to cant the heads to follow selectable orbits. With a combination of radial and circumferential movement, the heads are rotated along a selected orbit, e.g., an oval orbit, a peanut orbit, an eccentric egg-shaped orbit, or the like. Canting movement tilts the direction which the detector heads face relative to the center-of-rotation. With further reference to FIG. 1, an orbit controller 24 generates motor control signals for each of the motors to cause the detector heads to move along the selected orbit. More specific to the illustrated embodiment, the orbit controller includes a look-up table 26 which is preprogrammed with positions which the detector heads and gantry should take to move the focal point $(x_f, y_f)$ along the selected orbit. A current position sensor 28 monitors the current position of the detector head(s), such as by monitoring the angular position around the subject, the radial position toward and away from the subject, and the canting relative to the axis of rotation. A comparator 30 compares the look-up table values with the actual rotational positions of the detector heads and gantry. A series of motor drivers 32 supply power to the motors 22 until the monitored current position matches the desired position from the look-up table. Optionally, descriptions of a plurality of orbits are selectively loadable into the look-up table 26.

The gantry 16 or an associated control console includes a data processor for processing the output data from the detector head(s). More specifically, each detector head conventionally includes a scintillation crystal that is viewed by an array of photomultiplier tubes. Each time a radiation event occurs, the radiation passing through the collimator 14 and striking the crystal causes a light flash or scintillation. The photomultiplier tubes nearest the scintillation respond with proportional output signals. Position and energy resolving circuitry connected to the photomultiplier tubes determine the energy and position, hence the ray or direction q(s) along which the radiation travelled from the radiation event within the subject through the collimator 14 to the detector head.

Figure 4:
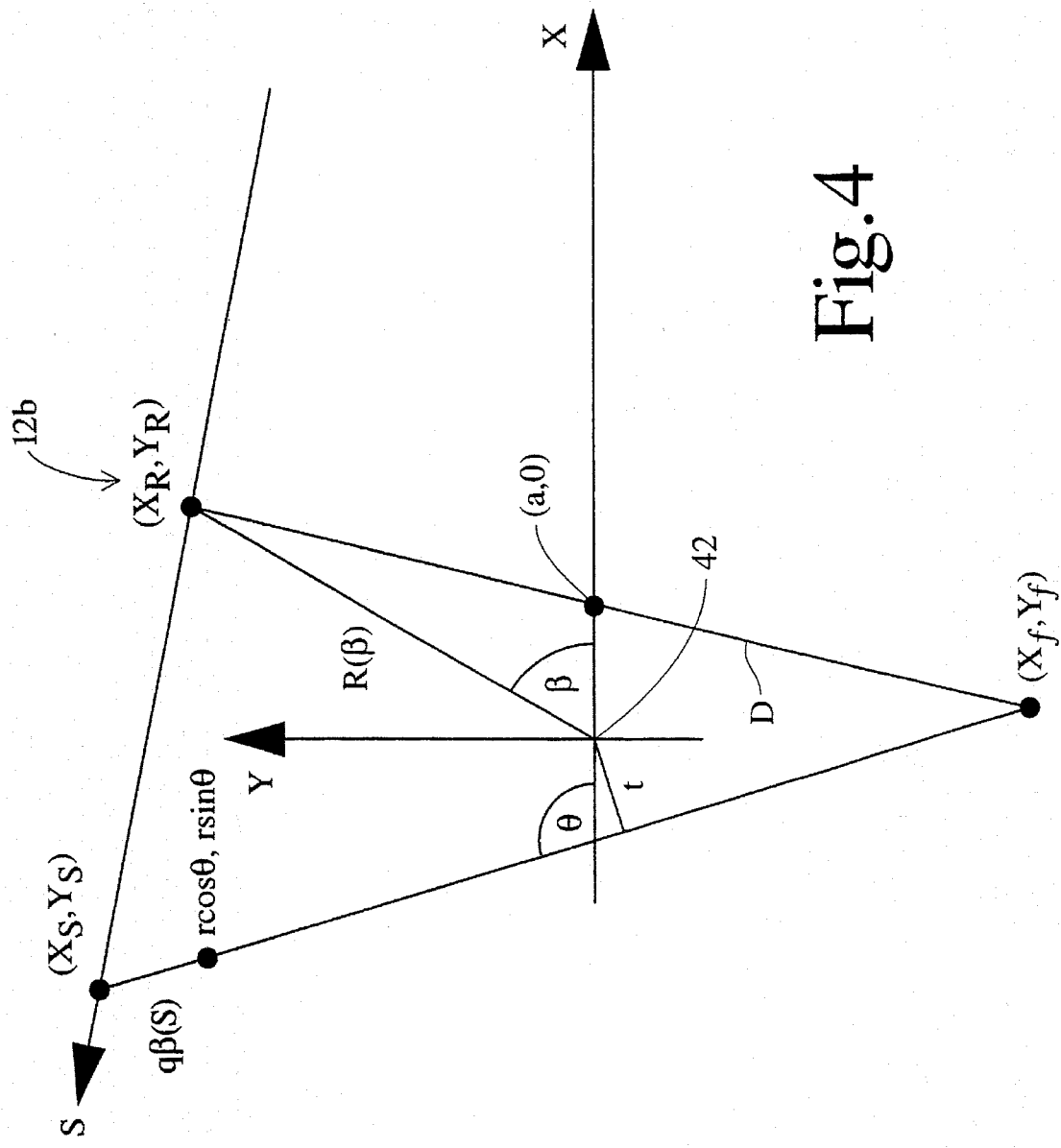
FIG. 4 illustrates a fan-beam imaging geometry.

With continuing reference to FIG. 1 and further reference to FIG. 4, each detector head 12 is positioned such that its central perpendicular projection ray 40 of the detector maintains a path through a select point (a,0) of a desired region of interest, e.g., the heart. The central projection ray is centered on the region of interest instead of at a center of rotation 42 to eliminate image truncation.

A projection data memory 44 stores counts indicative of the number of scintillation events at each coordinate $(x_s, y_s)$ of the detector head at each angular position around the subject. A circuit or software routine 46 measures the angular position $\beta$ of the detector around the axis of rotation. A circuit or software routine 48 determines the distance $R(\beta)$ between a center of the detector $(x_r, y_r)$ and the axis of rotation 42, e.g., by looking up the radius in the orbit look-up table 26.

For each pixel value or data element $(x_s, y_s)$ on the detector head, there is a corresponding ray $q_\beta(s)$ which extends through the point $(x_s, y_s)$ and the apex of the fan-beam. This ray is characterized by the angle $\theta$ as defined in FIG. 4, i.e., the angle between the ray $q_\beta(s)$ and the x-coordinate axis which extends through the center of rotation 42. A circuit 50 determines the angle $\theta$ for each of the data values in the memory 44 and a ray identifying processor or software routine 52 identifies the corresponding ray $q_\beta(s)$. A Jacobian calculating processor or circuit 54 calculates a Jacobian weighting function $J(r,\theta,\beta)$ in accordance with Equation (19) below using the current detector head position information from the orbit look-up table 26 and the current coordinate position from the data memory 44.

A backprojector 56 backprojects each individual data value $(x_s, y_s)$ from the data memory 44 into a first or blurred image memory 58.

The backprojector 56 includes a backprojection path or trajectory calculator 60 which calculates a path through the three-dimensional image memory 58 corresponding to each ray $q_\beta(s)$. An indexing routine or circuit 62 indexes an adder 64 which adds a value to each memory cell of the image memory which lies along the trajectory determined by the backprojector trajectory determining processor 60. The indexer 62 indexes a memory addresser 66 which progressively addresses memory cells along the calculated trajectory.

The indexer 62 also indexes the Jacobian calculating circuit 54 as the path projects deeper into the image to increment the Jacobian. A weighting circuit 68 weights each data value by the Jacobian from the Jacobian calculating circuit 54. In this manner, the Jacobian weighting is indexed along the trajectory through image space. The sum of all data values $(x_s, y_s)$ weighted by the appropriate Jacobian, for all positions of the detector heads are projected along their respective rays and are summed to produce a resultant image which is blurred with a 1/r weighting.

A deconvolver 70 deconvolves the backprojected blurred image from the image memory 58 with a 1/r deconvolution function to remove the blurring. Again, r connotes distance along the radial polar coordinate in image space. The deconvolver includes a two-dimensional Fourier transform circuit 72 which transforms the blurred image from the image memory 58 into Fourier-space. A multiplier 74 multiplies the Fourier-space image with a ramp filter from a ramp filter memory 76. The ramp filter filters in accordance with 1|R|, where R is the radial polar coordinate in frequency space. Multiplying by the 1|R| ramp function removes the 1/r blurring in the image. An inverse Fourier transform 78 transforms the filtered image from Fourier space back to image space.

The deconvolved, hence 1/r blurring-free image, is stored in a corrected image memory 80. A video processor 82 reformats selected portions of the three-dimensional image data in the image memory into planar images, slices, three-dimensional renderings, serial slices, curved cut plane images, and the like. The video monitor 84, printer, or the like converts the image data into a human-readable display.

Figure 3:
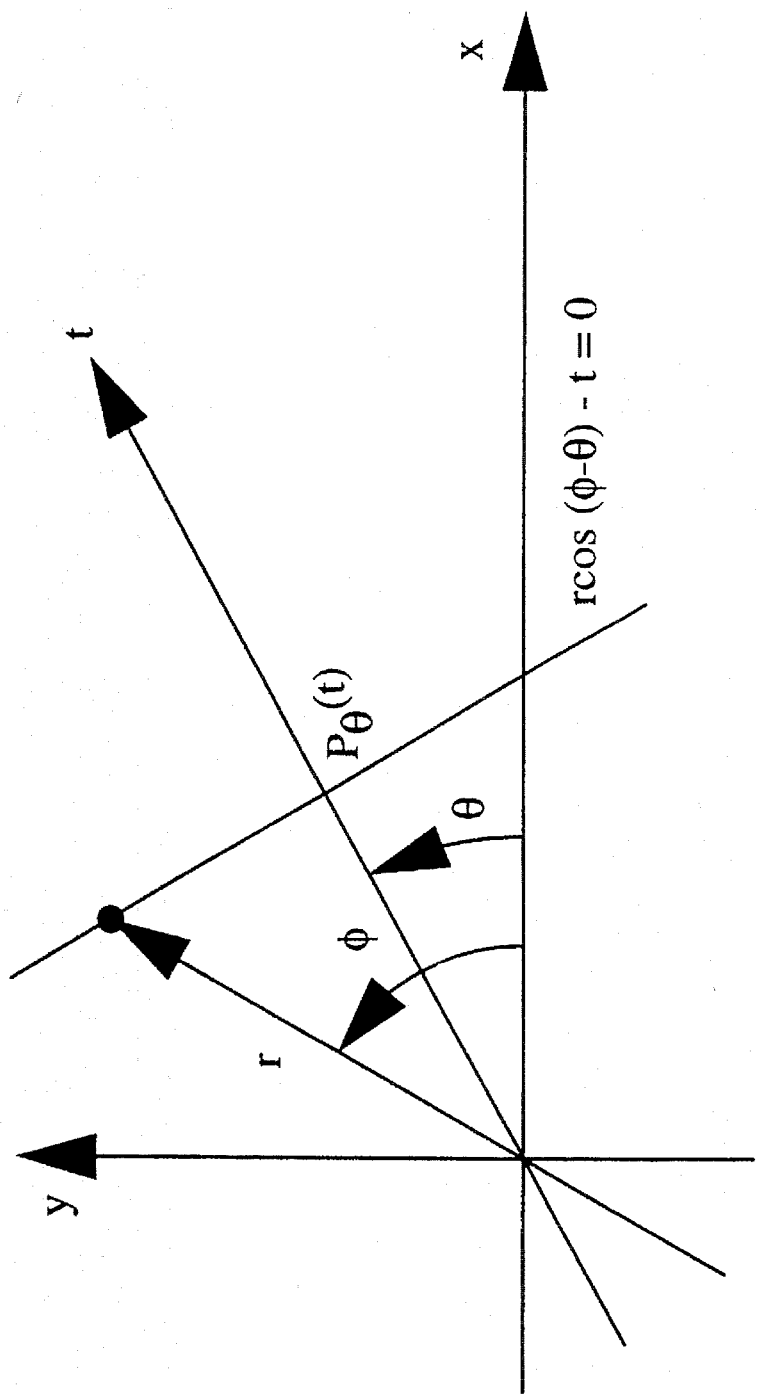
FIG. 3 illustrates a parallel-beam imaging geometry.

With reference to FIG. 3, a parallel beam imaging geometry is shown. The efficiency of a backprojection filtering algorithm depends on the proper weighting factor. To derive a weighting factor for parallel beam imaging geometry, the projection of a two-dimensional density function $f(r,\phi)$ at angle $\theta$ is given by:

$$p_\theta(t) = \int_0^{2\pi} \int_0^\infty f(r,\phi)\delta(r\cos(\phi - \theta) - t)r\, dr\, d\phi. \qquad (1)$$

The equivalent Cartesian coordinate system equation for the density function $f(x,y)$ is:

$$p_\theta(t) = \int_{-\infty}^\infty \int_{-\infty}^\infty f(x,y)\delta(x\cos\phi + y\sin\phi - t)dx\, dy. \qquad (1a)$$

The backprojection of $p_\theta(t)$ is:

$$b(r,\phi) = \frac{1}{2} \int_0^{2\pi} p_\theta(r\cos(\phi - \theta))d\theta. \qquad (2)$$

Having the projection and backprojection defined by Equation (1) and Equation (2), respectively, the backprojection is represented by:

$$b(r,\phi) = f(r,\phi) * \frac{1}{r}, \qquad (3)$$

where "*" denotes a two-dimensional convolution.

With reference to FIG. 4, in fan-beam imaging geometry, the data is a projection $q_\beta(s)$, which is the line integral of a two-dimensional density function $f(r,\phi)$ along a line $r\cos(\phi - \theta) - t = 0$. With a face of the detector head 12b being along S, the detector has a center-of-rotation at 70, a fan-beam focal point at $(x_f, y_f)$, and a detector center point at $(X_R, Y_R)$. A central ray 82 of the detector passes through a fixed point $(a, 0)$. The projection of $f(r,\phi)$ at angle $\beta$ is given by:

$$q_\beta(s) = \int_0^{2\pi} \int_0^\infty f(r,\phi)\delta(r\cos(\phi - \theta) - t)r\, dr\, d\phi. \qquad (4)$$

where $\theta$ and $t$ are defined in Equations (10) and (11) below. For a given orbit $R(\beta)$, the detector center is determined as:

$$x_R = R(\beta)\cos\beta$$
$$y_R = R(\beta)\sin\beta \qquad (5).$$

The coordinates $(x_f, y_f)$ of the focal point are obtained by the fact that the detector coordinates $(X_R, Y_R)$, the fixed off-center-of-rotation point in the region of interest on which the center ray of the detector is focused $(a, 0)$, and the focal point coordinates $(x_f, y_f)$ lie on a straight line and a distance from $(X_R, Y_R)$ to $(x_f, y_f)$ is the focal length D, i.e.:

$$x_f = a + (1 - D/B)[R(\beta)\cos\beta - a]$$
$$y_f = (1 - D/B)R(\beta)\sin\beta \qquad (6),$$

where B is a distance from $(X_R, Y_R)$ to $(a, 0)$, i.e.:

$$B = \sqrt{R^2(\beta) - 2aR(\beta)\cos(\beta) + a^2}. \qquad (7)$$

Using the fact that the detector is orthogonal to its central ray and the distance from $(x_s, y_s)$ to $(X_R, Y_R)$ is $|s|$, the coordinates are:

$$x_s = -\frac{sR(\beta)\sin\beta}{B} + R(\beta)\cos\beta \qquad (8)$$

$$y_s = R(\beta)\sin\beta + \frac{s[R(\beta)\cos\beta - a]}{B}.$$

Using the focal point coordinates $(x_f, y_f)$ and $(x_s, y_s)$, the straight line equation of the projection ray is:

$$\frac{x - x_s}{x_f - x_s} = \frac{y - y_s}{y_f - y_s}. \qquad (9)$$

Using Equation (9), the parameters $t$ and $\theta$ from Equation (4) are obtained as:

$$t = \frac{x_s(y_f - y_s) - y_s(x_f - x_s)}{\sqrt{(y_f - y_s)^2 + (x_f - x_s)^2}}, \qquad (10)$$

and:

$$\theta = \tan^{-1}\frac{y_f - y_s}{x_f - x_s}. \qquad (11)$$

Using equivalent terms, $t$ and $\theta$ become:

$$t = \frac{s[BD - R(\beta)(R(\beta)\cos\beta - a)]aRD\sin\beta}{B\sqrt{D^2 + s^2}}, \qquad (12)$$

and:

$$\theta = \tan^{-1}\frac{DR(\beta)\sin\beta + s[R(\beta)\cos\beta - a]}{D[R(\beta)\cos\beta - a] - sR(\beta)\sin\beta}. \qquad (13)$$

By comparing the projection of the two-dimensional density function for parallel beam imaging from Equation (1) and the projection equation of the two-dimensional density function for fan-beam imaging from Equation (4), it shows that when Equations (12) and (13) are held:

$$P_\theta(t) = q_\beta(s) \qquad (14).$$

A weighted backprojection is obtained by substituting Equation (14) into Equation (2). The backprojected image is the same as the parallel beam backprojection $b(r,\phi)$.

With $t$ equated as:

$$t = r\cos(\phi - \theta) \qquad (15),$$

then the distance $s$ is computed by using Equation (12) as:

$$s = \frac{-aRD\sin\beta + xD(R\cos\beta - a) + yDR\sin\beta}{xR\sin(\beta) - y(R\cos\beta - a) - BD + R(R - a\cos\beta)}, \qquad (16)$$

where $R = R(\beta)$.

The backprojection point $(x, y)$ is:

$$x = r\cos\phi$$
$$y = r\sin\phi \qquad (17).$$

When variable $\theta$ is changed into $\beta$, the Jacobian $J(r,\phi,\beta)$ meets the condition:

$$d\theta = J(r,\phi,\beta)d\beta \text{ with } J = \frac{d\theta}{d\beta}. \qquad (18)$$

By evaluating the derivative of Equation (13) with respect to $\beta$, the Jacobian becomes:

$$J = \frac{Ds'_\beta}{D^2 + s^2} + \frac{R^2(\beta) - aR(\beta)\cos\beta - aR'(\beta)\sin\beta}{R^2(\beta) + a^2 - 2aR(\beta)\cos\beta}, \qquad (19)$$

where the distance $s$ is given in Equation (16), $s'_\beta$ is the derivative of Equation (16) with respect to $\beta$, and $R'(\beta)$ is the derivative of the orbit function $R(\beta)$. In Equation (19), $D^2 + s^2$ is the squared distance from the focal point $(x_f, y_f)$ to the point $(x_s, y_s)$ and $R^2(\beta)+a^2-2aR(\beta)\cos\beta$ is the squared distance from the detector coordinates $(X_R, y_R)$ to the off-center-of-rotation point $(a,0)$. Hence:

$$b(r,\phi) = \frac{1}{2} \int_0^{2\pi} q_\beta(s) J(r,\phi,\beta) d\beta. \tag{20}$$

The weighted fan-beam backprojection given in Equation (20) satisfies Equation (3). Therefore, the original function f can be reconstructed by applying a two-dimensional ramp-filter to $b(r,\phi)$. A preferred backprojection filtering algorithm is implemented in two steps: (i) weighted backproject the projections as shown in Equation (20), and (ii) deconvolve the point response function 1/r as in Equation (3) by taking a two-dimensional fast Fourier transform of b, multiplying the transformed image by a two-dimensional ramp-filter, and taking the two-dimensional inverse fast Fourier transform to obtain the final image.

When a=0, this algorithm reduces to the regular backprojection filtering fan-beam algorithm with a non-circular orbit. In this special case, the Jacobian is:

$$J = \frac{Ds'_\beta}{D^2 + s^2} + 1. \tag{21}$$

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for generating an image representation of an interior portion of a subject, the apparatus comprising:

a radiation detector which receives radiation and generates views of electrical data indicative thereof;

a collimator connected with the detector to limit received radiation to radiation travelling along a fan of rays passing from an apex to a planar face of the detector;

a means for orbiting the radiation detector and collimator around a center-of-rotation through the subject with the detector face constrained to face perpendicular to a ray passing through a selected point in a region of interest offset from the center-of-rotation as the detector orbits around the center-of-rotation;

a ray processor for determining a ray travelled by each radiation event received by the radiation detector;

a backprojection trajectory processor for determining a path through image space corresponding to each ray;

a weighting circuit for repeatedly weighting each data value with a weighting factor that changes with position in image space;

an indexing means for indexing the weighting factor with position along the path through image space;

an adder for adding each weighted data value to a corresponding memory cell of an image memory to produce an image which is blurred in accordance with position in image space;

a deconvolver for deconvolving the blurred image in accordance with image space position to generate a deconvolved image representation with the blurring removed;

a deconvolved image memory for storing the deconvolved image representation.

2. The apparatus as set forth in claim 1 wherein the deconvolver includes:

a two-dimensional Fourier transform circuit for transforming each backprojected view into Fourier space;

a multiplier for multiplying each Fourier space view by a corresponding two-dimensional ramp-filter; and, a two-dimensional inverse Fourier transform for transforming each filtered view out of Fourier space.

3. The apparatus as set forth in claim 1 wherein the image is blurred in accordance with a convolution of a shift invariant blurring function and wherein the deconvolver deconvolves the blurred image with a ramp function, which is an inverse of a Fourier transform of the shift invariant blurring function.

4. The apparatus as set forth in claim 1 further including:

a means for determining a current position of the detector;

a means for calculating the weighting factor in accordance with the current position of the detector when each radiation event is received and geometry of the orbit.

5. The apparatus as set forth in claim 4 wherein:

the current detector position determining means determines a current detector center ray angle of a ray between a center-of-rotation and a reference direction; and the weighting factor calculating means determines a ratio of (i) a change in an angle of the ray along which each radiation event is received and (ii) a change in the detector center ray angle.

6. The apparatus as set forth in claim 4 wherein the weighting factor is a Jacobian.

7. In an apparatus for generating an image representation of an interior portion of a subject having a radiation detector for receiving radiation travelling along a fan of rays and generating electronic data at each of a plurality of angular orientations around the subject, and a backprojector for backprojecting the electronic data into an image memory, the improvement comprising:

a weighting means for weighting the backprojected electronic data by a weighting factor which changes in accordance with each location in image space into which the weighted data are backprojected, the backprojected weighted data received in the image memory forming a blurred image which is blurred generally in accordance with 1/r, where r is a distance along a radial polar coordinate in image space; and a deconvolver for deconvolving the blurred image in accordance with 1/r to generate a corrected image.

8. In the apparatus as set forth in claim 7, the deconvolver including:

a two-dimensional Fourier transform for transforming the blurred image into Fourier space;

a multiplier for multiplying the blurred image by a ramp-filter with 1/|R| dependency, where R is the radial polar coordinate in Fourier space; and, a two-dimensional inverse Fourier transform for transforming the filtered data out of Fourier space.

9. In an apparatus for generating an image representation of an interior portion of a subject, which apparatus has a radiation detector head for receiving radiation travelling along a fan of rays and generating electronic data at each of a plurality of angular orientations of the detector head around the subject, and a backprojector for backprojecting the electronic data into an image memory, the improvement comprising:

a means for determining a current angular orientation of the detector head;

a means for calculating a weighting factor in accordance with the current angular orientation of the detector head when each radiation event is received, a location on the detector head at which each radiation event is received, and geometry of the orbit; and a weighting means for weighting the backprojected electronic data with the calculated weighting factors.

10. In the apparatus as set forth in claim 9, the improvement further comprising:

the current detector position determining means determines a current detector center ray angle of a center ray between a center-of-rotation and a reference direction;

a means for determining a radiation ray which radiation causes each radiation event is received; and the weighting factor calculating means determines a ratio of (i) a change in an angle of the radiation ray and (ii) a change in the detector center ray angle.

11. In an apparatus, for generating an image representation of an interior portion of a subject, which apparatus has a radiation detector that rotates around an axis of rotation for receiving radiation and generating electronic data at each of a plurality of angular orientations of the detector around the subject, a collimator for collimating radiation received by the detector to radiation travelling along a fan of rays, and a backprojector for backprojecting the electronic data into an image memory, the improvement comprising:

a weighting means for weighting the backprojected electronic data by a weighting factor which changes in accordance with each location in image space into which the weighted data are backprojected, the weighting factor being:

$$\frac{Ds'_\beta}{D^2 + s^2} + \frac{R^2(\beta) - aR(\beta)\cos\beta - aR'(\beta)\sin\beta}{R^2(\beta) + a^2 - 2aR(\beta)\cos\beta}$$

where D is a focal length of the collimator, $R(\beta)$ is a distance from the axis of rotation to a center of the detector at an angle of rotation $\beta$, $a$ is a fixed point offset from the axis-of-rotation through which a ray from a center of the detector passes at all angles of rotation, and s is a distance between the center of the detector and a point on the detector at which corresponding radiation is received.

12. A method for generating an image representation of an interior portion of a subject, the method comprising:

rotating a radiation detector about a selected point in the subject, which selected point is offset from an axis of rotation and canting the radiation detector such that a central normal ray from the radiation detector is constrained to pass through the selected point;

with the radiation detector, converting radiation received along radiation rays into electronic data;

collimating the received radiation such that the detector is limited to receiving radiation travelling along fan-shaped array of radiation rays which converge at a focal spot;

backprojecting the electronic data received along each of the radiation rays into an image memory;

weighting each backprojected electronic data with a weighting value that changes with location in image space into which the electronic data is backprojected.

13. The method as set forth in claim 12 wherein each data value is weighted by a weighting function which varies in accordance with a coordinate in image space, and wherein the electronic data backprojected into the image memory forms an image which is blurred by virtue of being convolved in accordance with the coordinate in image space, and further including:

deconvolving the image from the image memory to generate a corrected image representation.

14. The method as set forth in claim 13 wherein the deconvolving includes:

transforming the backprojected data from image space into Fourier space;

in Fourier space, multiplying the data with a two-dimensional ramp-filter; and transforming the data from Fourier space back into image space.

15. The method as set forth in claim 12 wherein the backprojecting step includes:

determining a backprojection trajectory through image space for each data value, the image memory having a plurality of memory cells;

adding the weighted electronic data value to each memory cell corresponding to the trajectory; and changing the weighting factor from memory cell to memory cell along the trajectory.

16. The method as set forth in claim 15 wherein the weighting factor calculating step includes determining a ratio of (i) a change in an angle between each radiation ray and a reference axis through the axis of rotation and the selected point and (ii) a change in an angle between a center ray from a center of the detector to the axis of rotation and the reference axis.

* * * * *

UNITED STATES PATENT AND TRADEMARK OFFICE
CERTIFICATE OF CORRECTION

PATENT NO. : 5,532,490
DATED : July 2, 1996
INVENTOR(S) : Gullberg et al.

It is certified that error appears in the above-identified patent and that said Letters Patent is hereby corrected as shown below:

Column 1,
Line 4, insert -- This invention was made with US Government support under Grant No. R01 HL 399792-05 awarded by the National Institute of Health. The government has cetain rights to this invention. --

Signed and Sealed this

Twenty-fifth Day of May, 2004

JON W. DUDAS
*Acting Director of the United States Patent and Trademark Office*